United States Patent
Ko (10) Patent No.: US 11,652,217 B2
(45) Date of Patent: May 16, 2023

(54) FUEL CELL

(71) Applicants: Hyundai Motor Company, Seoul (KR); Kia Motors Corporation, Seoul (KR)

(72) Inventor: Hyun Woong Ko, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 185 days.

(21) Appl. No.: 17/063,130

(22) Filed: Oct. 5, 2020

(65) Prior Publication Data

US 2021/0280875 A1 Sep. 9, 2021

(30) Foreign Application Priority Data

Mar. 3, 2020 (KR) .................. 10-2020-0026491

(51) Int. Cl.
*H01M 8/0202* (2016.01)
*H01M 8/2465* (2016.01)

(52) U.S. Cl.
CPC ....... *H01M 8/0202* (2013.01); *H01M 8/2465* (2013.01); *H01M 2250/20* (2013.01)

(58) Field of Classification Search
None
See application file for complete search history.

(56) References Cited

U.S. PATENT DOCUMENTS

| 2016/0329577 A1* | 11/2016 | Shizuku | H01M 8/242 |
| 2017/0110754 A1* | 4/2017 | Nishiyama | H01M 8/2465 |
| 2020/0251765 A1* | 8/2020 | Ikeda | H01M 8/247 |

FOREIGN PATENT DOCUMENTS

JP 2004-221061 A 8/2004

* cited by examiner

*Primary Examiner* — Alix E Eggerding
(74) *Attorney, Agent, or Firm* — Fox Rothschild LLP

(57) ABSTRACT

A fuel cell is provided to include a cell stack in which unit cells are stacked in a first direction, an end plate disposed at the end of the cell stack, and a current-collecting plate disposed between the end plate and the end of the cell stack. The current-collecting plate includes a conductive area having a conductive surface, which is in electrically conductive surface contact with a reaction surface of the end of the cell stack, and configured to collect power generated by the cell stack, and an airtight area having an airtight surface, which is in airtight surface contact with a non-reaction surface of the end of the cell stack, and surrounding the conductive area. The degree to which the conductive surface protrudes toward the end of the cell stack is different from the degree to which the airtight surface protrudes toward the end of the cell stack.

17 Claims, 10 Drawing Sheets

FUEL CELL

CROSS-REFERENCE TO RELATED APPLICATION(S)

This application claims the benefit of Korean Patent Application No. 10-2020-0026491, filed on Mar. 3, 2020, which is hereby incorporated by reference as if fully set forth herein.

BACKGROUND

Field of the Disclosure

The present disclosure relates to a fuel cell, and more particularly, to a fuel cell having improved airtightness and electrical conductivity.

Discussion of the Related Art

In general, a fuel cell includes a cell stack, an end plate, and a current-collecting plate. Power generated using hydrogen and oxygen in the cell stack may be transmitted to the outside through the current-collecting plate disposed between the cell stack and the end plate.

However, when the current-collecting plate is not in surface contact with or is in incomplete surface contact with the reaction surface of the end cell disposed at the end of the cell stack, it may be difficult for the current-collecting plate to sufficiently provide an electrical path for transmitting the power generated in the cell stack to the outside. Further, when the current-collecting plate is not in airtight contact with the end cell, surface pressure may not be distributed uniformly over the reaction surface of the cell stack.

SUMMARY

Accordingly, the present disclosure are directed to a fuel cell that substantially obviates one or more problems due to limitations and disadvantages of the related art. According to one aspect, the present disclosure provides a fuel cell having improved airtightness and electrical conductivity.

A fuel cell according to an exemplary embodiment may include a cell stack having a plurality of unit cells stacked in a first direction, an end plate disposed at the end of the cell stack, and a current-collecting plate disposed between the end plate and the end of the cell stack. The current-collecting plate may include a conductive area having a conductive surface formed to be in electrically conductive surface contact with a reaction surface of the end of the cell stack that faces the current-collecting plate in the first direction, the conductive area being configured to collect power generated by the cell stack, and an airtight area having an airtight surface formed to be in surface contact with a non-reaction surface of the end of the cell stack that faces the current-collecting plate in the first direction, the airtight area surrounding the conductive area. The degree to which the conductive surface protrudes toward the end of the cell stack in the first direction and the degree to which the airtight surface protrudes toward the end of the cell stack in the first direction may be different from each other.

For example, each of the plurality of unit cells may include a membrane electrode assembly, a gas diffusion layer disposed on each of opposite sides of the membrane electrode assembly, a separator disposed outside the gas diffusion layer to separate each of the plurality of unit cells from another cell, and a cell frame coupled to the membrane electrode assembly, the gas diffusion layer, and the separator. For example, the airtight surface may protrude further toward the end of the cell stack in the first direction than the conductive surface.

Additionally, the current-collecting plate may include a body having at a first side thereof the conductive surface that is in surface contact with the separator, which is the end of the cell stack, and a current-collecting frame configured to fill the space between a second side of the body and the separator in the airtight area. For example, the body and the current-collecting frame may be integrally formed with or separately provided from each other.

The material of the cell frame and the material of the current-collecting frame may be the same as or different from each other. For example, at least one of the cell frame or the current-collecting frame may have at least one of elasticity or electrical insulativity. The conductive surface may protrude further toward the end of the cell stack in the first direction than the airtight surface.

The current-collecting plate may include a body having at a first side thereof the airtight surface that is in airtight surface contact with the cell frame corresponding to the non-reaction surface, and the body may have at a second side thereof the conductive surface that protrudes toward the gas diffusion layer corresponding to the reaction surface, the separator, or the membrane electrode assembly to be in surface contact therewith. For example, the current-collecting plate may include a current collector that corresponds to the conductive area and having electrical conductivity, and an insulator that corresponds to the airtight area, surrounding the current collector, and having electrical insulativity.

The insulator may include a plurality of manifolds through which fluid may be introduced from the outside or discharged to the outside. The current-collecting plate may further include a current-collecting terminal extending from the current collector in a second direction crossing the first direction and configured to provide power to the outside. For example, the insulator may have elasticity. The current-collecting plate may further include an adhesive to combine the current collector and the insulator. For example, the current collector may include at least one through-hole through which at least a portion of the insulator passes.

BRIEF DESCRIPTION OF THE DRAWINGS

Arrangements and exemplary embodiments may be described in detail with reference to the following drawings in which like reference numerals refer to like elements and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present disclosure will now be described more fully hereinafter with reference to the accompanying drawings, in which various exemplary embodiments are shown. The examples, however, may be embodied in many different forms and should not be construed as being limited to the embodiments set forth herein. Rather, these embodiments are provided so that this disclosure will be more thorough and complete and will more fully convey the scope of the disclosure to those skilled in the art.

It will be understood that when an element is referred to as being "on" or "under" another element, it may be directly on/under the element, or one or more intervening elements may also be present. When an element is referred to as being "on" or "under", "under the element" as well as "on the element" may be included based on the element. In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell 100 according to an exemplary embodiment will be described with reference to the accompanying drawings. The fuel cell 100 will be described using the Cartesian coordinate system (x-axis, y-axis, z-axis) for convenience of description. However, other different coordinate systems may be used. In the drawings, an x-axis, a y-axis, and a z-axis of the Cartesian coordinate system are perpendicular to each other. However, the embodiment is not limited thereto. In other words, the x-axis, the y-axis, and the z-axis may cross each other. Hereinafter, the x-axis direction may be referred to as a "first direction", the z-axis direction may be referred to as a "second direction", and the y-axis direction may be referred to as a "third direction".

Figure 1:
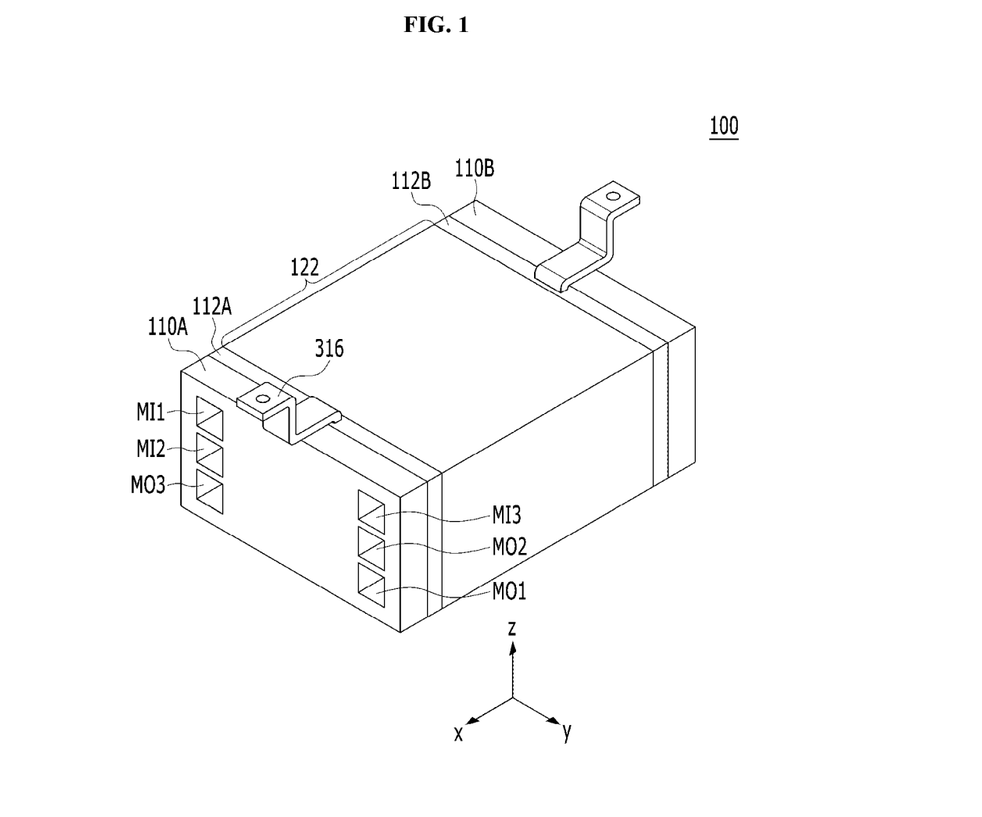
FIG. 1 is a perspective view showing the external appearance of a fuel cell according to an exemplary embodiment of the present disclosure.

FIG. 1 is a perspective view showing the external appearance of a fuel cell 100 according to an exemplary embodiment. The fuel cell 100 may be, for example, a polymer electrolyte membrane fuel cell (or a proton exchange membrane fuel cell) (PEMFC), which has been studied extensively as a power source for driving vehicles. However, the exemplary embodiment is not limited to any specific form of the fuel cell 100.

The fuel cell 100 may include first and second end plates (e.g., pressing plates or compression plates) 110A and 110B, first and second current-collecting plates 112A and 112B, and a cell stack 122. The cell stack 122 may include a plurality of unit cells stacked on one another in the first direction. Each of the first and second end plates 110A and 110B may be disposed at a respective ends of the cell stack 122, and may support and fix the unit cells. In other words, the first end plate 110A may be disposed at a first end of the cell stack 122, and the second end plate 110B may be disposed at a second end (e.g., opposite to the first end) of the cell stack 122.

In addition, the fuel cell 100 may further include a clamping member (not shown). The clamping member may clamp the unit cells in the first direction together with the first and second end plates 110A and 110B. For example, the clamping member may have a bar shape, a long bolt shape, a belt shape, or a rigid rope shape to clamp the unit cells. Alternatively, the clamping member may have an enclosure shape to clamp the unit cells. However, the fuel cell according to the embodiment is not limited to any specific shape of the clamping member.

According to an exemplary embodiment, as shown in FIG. 1, the first end plate 110A may include first to third inlet communication portions (or inlet manifolds) MI1, MI2, and MI3 and first to third outlet communication portions (or outlet manifolds) MO1, MO2, and MO3. According to another exemplary embodiment, unlike the illustration in FIG. 1, some of the first to third inlet communication portions MI1, MI2, and MI3 and some of the first to third outlet communication portions MO1, MO2, and MO3 may be disposed in the second end plate 110B, rather than in the first end plate 110A. However, the exemplary embodiment is not limited to any specific positions of the first to third inlet communication portions MI1, MI2, and MI3 and the first to third outlet communication portions MO1, MO2, and MO3. The first to third inlet communication portions MI1, MI2, and MI3 and the first to third outlet communication portions MO1, MO2, and MO3 will be described later in more detail.

Figure 2:
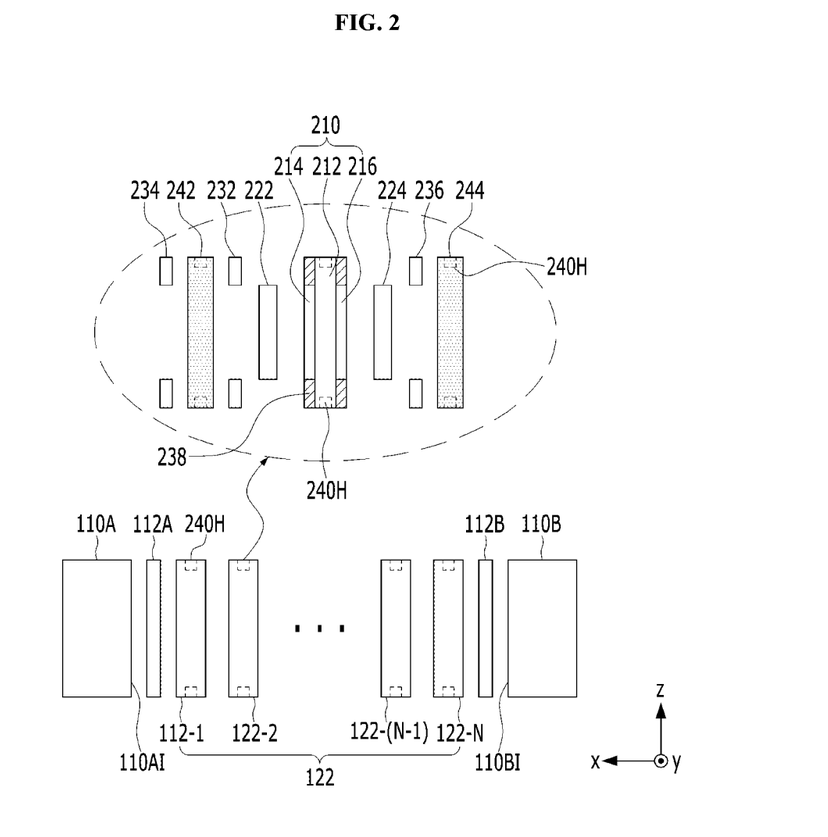
FIG. 2 is a cross-sectional view of a portion of the fuel cell shown in FIG. 1 according to an exemplary embodiment of the present disclosure.

FIG. 2 is a cross-sectional view of the first and second end plates 110A and 110B, the first and second current-collecting plates 112A and 112B, and the cell stack 122 in the fuel cell 100 shown in FIG. 1. For convenience of description, a current-collecting terminal 316 of each of the first and second current-collecting plates 112A and 112B shown in FIG. 1 is not illustrated in FIG. 2, and will be described later in detail with reference to FIGS. 3, 5 and 6.

The first and second end plates 110A and 110B, the first and second current-collecting plates 112A and 112B, and the cell stack 122 shown in FIG. 2 correspond to the first and second end plates 110A and 110B, the first and second current-collecting plates 112A and 112B, and the cell stack 122 shown in FIG. 1, respectively, and thus the same reference numerals are used for the same components.

Referring to FIG. 2, the cell stack 122 may include a plurality of unit cells 122-1 to 122-N, which are stacked in the first direction. In particular, "N" is a positive integer of 1 or greater, and may range from several tens to several hundreds. "N" may be determined based on the intensity of the power to be supplied from the fuel cell 100 to a load. Additionally, "load" may refer to a part of a vehicle that requires power. Each unit cell 122-$n$ may include a membrane electrode assembly (MEA) 210, first and second gas diffusion layers (GDLs) 222 and 224, a plurality of gaskets 232, 234 and 236, and first and second separators (or bipolar plates) 242 and 244. Here, 1≤n≤N.

The membrane electrode assembly 210 has a structure in which catalyst electrode layers, in which electrochemical reaction occurs, may be attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 may be disposed between the fuel electrode 214 and the air electrode 216. Hydrogen, which is the fuel in the fuel cell 100, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the first and second gas diffusion layers 222 and 224 and the first and second separators 242 and 244, which are conductors.

To realize the above operation, a catalyst layer may be applied to each of the fuel electrode 214 and the air electrode 216. The movement of the electrons described above causes the electrons to flow through an external wire, thus generating current. In other words, the fuel cell 100 may be configured to generate power due to the electrochemical reaction between hydrogen, which is fuel, and oxygen contained in the air.

In the air electrode 216, the hydrogen ions supplied through the polymer electrolyte membrane 212 and the electrons transferred through the first and second separators 242 and 244 meet oxygen in the air supplied to the air electrode 216, thus causing a reaction that generates water ("condensate water" or "product water"). The condensate water generated in the air electrode 216 may pass through the polymer electrolyte membrane 212 and may be transferred to the fuel electrode 214. In some cases, the fuel electrode 214 may be referred to as a cathode, and the air electrode 216 may be referred to as an anode. Alternatively, the fuel electrode 214 may be referred to as an anode, and the air electrode 216 may be referred to as a cathode.

The first and second gas diffusion layers 222 and 224 uniformly distribute hydrogen and oxygen, which are reactant gases, and to transfer the generated electrical energy. Accordingly, the first and second gas diffusion layers 222 and 224 may be disposed on respective sides of the membrane electrode assembly 210. In other words, the first gas diffusion layer 222 may be disposed on the left side of the fuel electrode 214, and the second gas diffusion layer 224 may be disposed on the right side of the air electrode 216.

The first gas diffusion layer 222 may be configured to diffuse and uniformly distribute hydrogen supplied as a reactant gas through the first separator 242, and may be electrically conductive. The second gas diffusion layer 224 may be configured to diffuse and uniformly distribute air supplied as a reactant gas through the second separator 244, and may be electrically conductive. Each of the first and second gas diffusion layers 222 and 224 may be a microporous layer in which fine carbon fibers are combined. However, the disclosure is not limited to any specific configuration of the first and second gas diffusion layers 222 and 224.

The gaskets 232, 234 and 236 may be configured to maintain the airtightness and clamping pressure of the cell stack at an appropriate level with respect to the reactant gases and the coolant, to disperse the stress when the first and second separators 242 and 244 are stacked, and to independently seal the flow paths. Accordingly, since airtightness and watertightness may be maintained by the gaskets 232, 234 and 236, the flatness of the surfaces that are adjacent to the cell stack 122, which generates power, may be secured, and thus surface pressure may be distributed uniformly over the reaction surface of the cell stack 122. However, the disclosure is not limited to any specific number or positions of the gaskets shown in FIG. 2.

The first and second separators 242 and 244 may be configured to move the reactant gases and the cooling medium and to separate each of the unit cells from the other unit cells. In addition, the first and second separators 242 and 244 may be configured to structurally support the membrane electrode assembly 210 and the first and second gas diffusion layers 222 and 224 and to collect the generated current and transfer the collected current to the first and second current-collecting plates 112A and 112B.

The first and second separators 242 and 244 may be disposed outside the first and second gas diffusion layers 222 and 224, respectively. In other words, the first separator 242 may be disposed on the left side of the first gas diffusion layer 222, and the second separator 244 may be disposed on the right side of the second gas diffusion layer 224.

The first separator 242 may be configured to supply hydrogen as a reactant gas to the fuel electrode 214 through the first gas diffusion layer 222. Accordingly, the first separator 242 may include an anode plate (AP), in which a channel (i.e. a passage or a flow path) is formed to allow hydrogen to flow therethrough. The second separator 244 may be configured to supply air as a reactant gas to the air electrode 216 through the second gas diffusion layer 224. Accordingly, the second separator 244 may include a cathode plate (CP), in which a channel is formed to allow air containing oxygen to flow therethrough.

In addition, each of the first and second separators 242 and 244 may form a channel through which a cooling medium (e.g. coolant) may flow. Further, the first and second separators 242 and 244 may be formed of a graphite-based material, a composite graphite-based material, or a metal-based material. However, the disclosure is not limited to any specific material of the first and second separators 242 and 244. In addition, each of the first and second separators 242 and 244 may include first to third inlet communication portions MI1, MI2, and MI3 and first to third outlet communication portions MO1, MO2, and MO3.

The first inlet communication portion MI1 and the first outlet communication portion MO1 may be configured to communicate with each other, and hydrogen (or oxygen) as a reactant gas may be introduced through the first inlet communication portion MI1 from the outside and may be discharged through the first outlet communication portion MO1. The second inlet communication portion MI2 and the second outlet communication portion MO2 may be configured to communicate with each other, and oxygen (or hydrogen) as a reactant gas may be introduced through the second inlet communication portion MI2 from the outside and may be discharged through the second outlet communication portion MO2. The third inlet communication portion MI3 and the third outlet communication portion MO3 may be configured to communicate with each other, and a cooling medium may be introduced through the third inlet communication portion MI3 from the outside and may be discharged outside through the third outlet communication portion MO3.

As shown in FIG. 1, when the first and second outlet communication portions MO1 and MO2 are disposed at positions further downward than the first and second inlet communication portions MI1 and MI2, condensate water may be discharged toward the lower side of the unit cells 122-1 to 122-N, or may remain in the lower side thereof due to gravity. Each of the first and second end plates 110A and 110B may be configured such that a metal insert is surrounded by a plastic injection-molded product. The metal insert of each of the first and second end plates 110A and 110B may have high rigidity to withstand internal surface pressure, and may be formed by machining a metal material. For example, each of the first and second end plates 110A and 110B may be formed by combining a plurality of plates. However, the disclosure is not limited to any specific configuration of the first and second end plates 110A and 110B.

The first and second current-collecting plates 112A and 112B may be disposed between respective ends of the cell stack 122 and the inner surfaces 110AI and 110BI of the first and second end plates 110A and 110B that face the cell stack 122 in the first direction. The first and second current-collecting plates 112A and 112B be configured to collect the electrical energy generated by the flow of electrons in the cell stack 122 and supply the electrical energy to a load of the vehicle that uses the fuel cell 100.

Hereinafter, the configuration and operation of an exemplary embodiment 300 of the current-collecting plates 112A and 112B included in the fuel cell 100 will be described with reference to the accompanying drawings. The first current-collecting plate 112A and the second current-collecting plate 112B may have the same configuration and perform the same operation as each other. Therefore, the current-collecting plate 300 according to the exemplary embodiment may correspond to each of the first and second current-collecting plates 112A and 112B.

Figure 3:
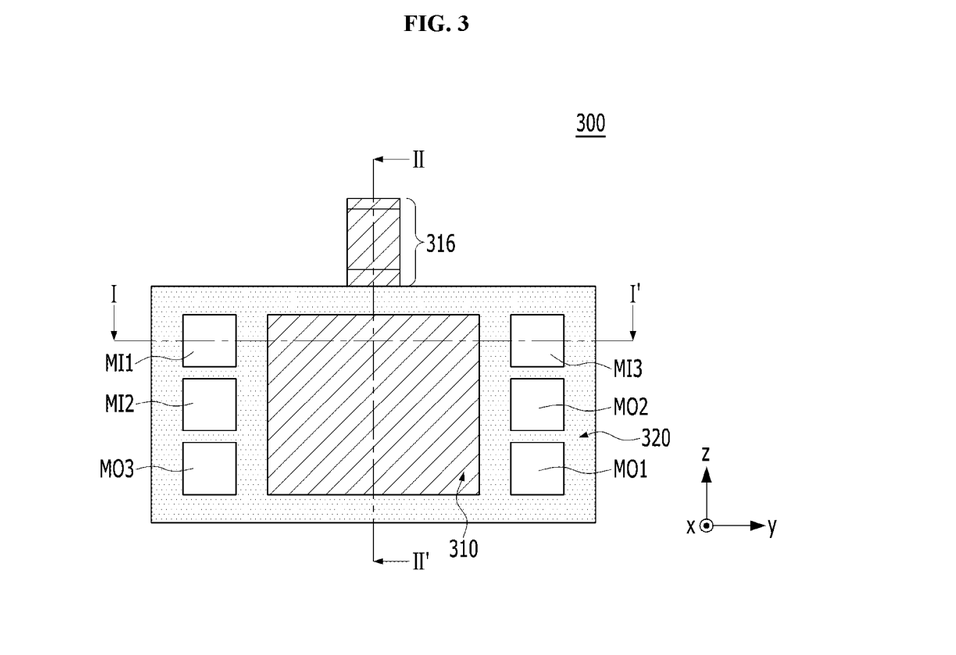
FIG. 3 is a front view of a current-collecting plate according to an exemplary embodiment of the present disclosure.
Figure 4:
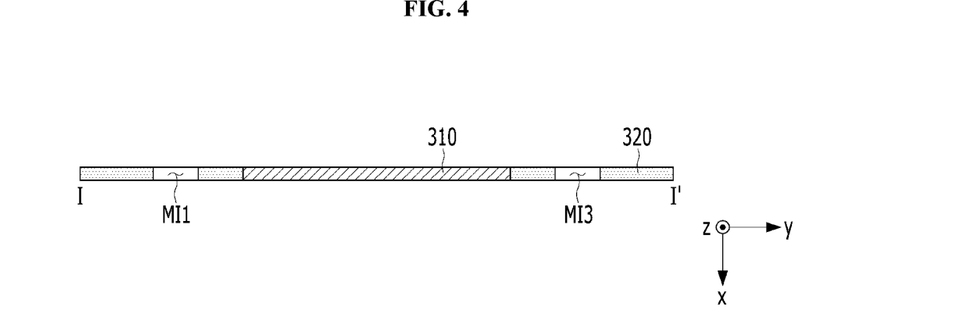
FIG. 4 is a cross-sectional view taken along line I-I' in the current-collecting plate shown in FIG. 3 according to an exemplary embodiment of the present disclosure.
Figure 5:
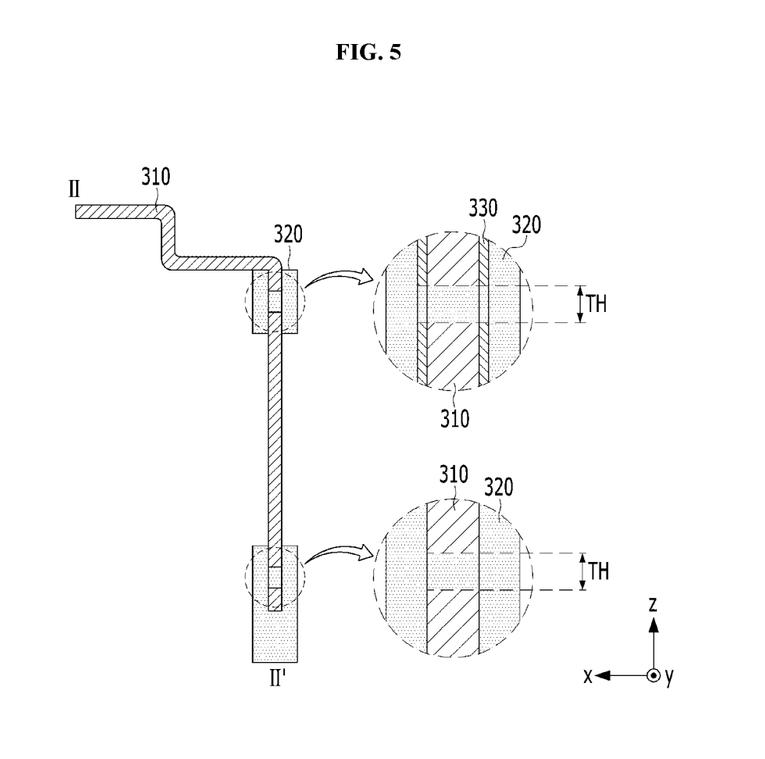
FIG. 5 is a cross-sectional view taken along line II-II' in the current-collecting plate shown in FIG. 3 according to an exemplary embodiment of the present disclosure.

FIG. 3 is a front view of the current-collecting plate 300 according to the exemplary embodiment, FIG. 4 is a plane view taken along line I-I' in the current-collecting plate 300 shown in FIG. 3, and FIG. 5 is a right side view taken along line II-IF in the current-collecting plate 300 shown in FIG. 3. Referring to FIGS. 3 to 5, the current-collecting plate 300 may include a current collector 310 and an insulator 320.

The current collector 310 may be electrically conductive, and may include a conductive area (or a 'cell reaction area'), and the insulator 320 may surround the current collector 310, may be electrically nonconductive, and may include an airtight area. The conductive area and the airtight area will be described later in detail. The insulator 320 may include a plurality of manifolds, for example, first to third inlet communication portions MI1, MI2, and MI3 and first to third outlet communication portions MO1, MO2, and MO3, through which fluid is introduced from the outside or discharged to the outside.

In addition, the current collector 310 may be formed of metal such as aluminum, and the insulator 320 may be formed of a material that is elastic and insulative, e.g. rubber or plastic. For example, when the material of the current collector 310 is metal and the material of the insulator 320 is rubber, the current-collecting plate 300 may be manufactured by injecting an elastic rubber material into a metal insert, which is formed through extrusion.

Figure 6:
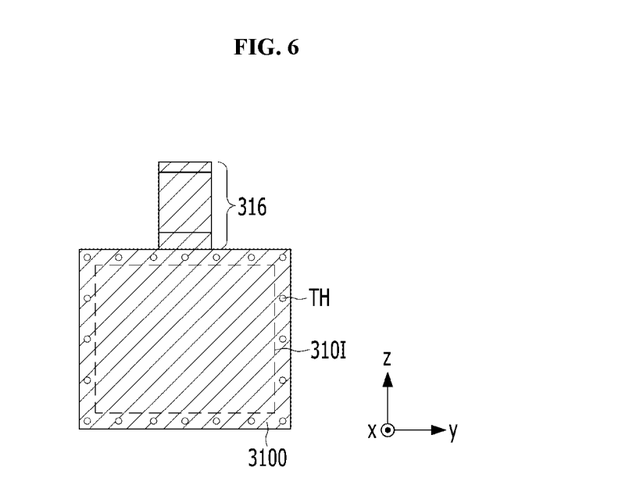
FIG. 6 is a front view of a current collector according to an exemplary embodiment of the present disclosure.

FIG. 6 is a front view of the current collector 310 according to the exemplary embodiment. The current collector 310 shown in FIG. 6 may include a center portion 3101, a peripheral portion 3100, and a current-collecting terminal 316. The center portion 3101 may be exposed rather than being surrounded by the insulator 320, and may correspond to the conductive area of the current-collecting plate 300.

The peripheral portion 3100 may not be exposed by being surrounded by the insulator 320, and may provide an airtight area. However, the disclosure is not limited thereto. For example, in the current-collecting plate 300, an area other than the center portion 3101, which is a conductive area, and the current-collecting terminal 316 may correspond to an airtight area of the current-collecting plate 300.

The current-collecting terminal 316 may extend from the peripheral portion 3100 in the second direction crossing the first direction and be configured to provide power to the outside. For example, the current-collecting terminal 316 may be in contact with at least one of a terminal block (not shown) or a bus bar (not shown) and may transmit power to the outside.

In addition, the current-collecting plate 300 may further include an adhesive 330. For example, as shown in FIG. 5, the adhesive 330 may combine the current collector 310 and the insulator 320. Therefore, the bonding force at the interface formed between the current collector 310, which is metal, and the insulator 320, which is rubber, may be increased by the adhesive 330.

In addition, the current collector 310 may include at least one through-hole TH (e.g., aperture). For example, as shown in FIG. 5, at least a portion of the insulator 320 may be disposed in the through-hole TH while passing through the same. When the insulator 320, which is, for example, a rubber injection-molded product, is disposed in the through-hole TH, it may be possible to prevent separation of the current collector 310 when the current-collecting plate 300 is manufactured by injecting an elastic rubber material into a metal insert, which is formed through extrusion. In other words, the through-hole TH may operate as a latching portion for preventing separation of the current collector 310.

Figure 7:
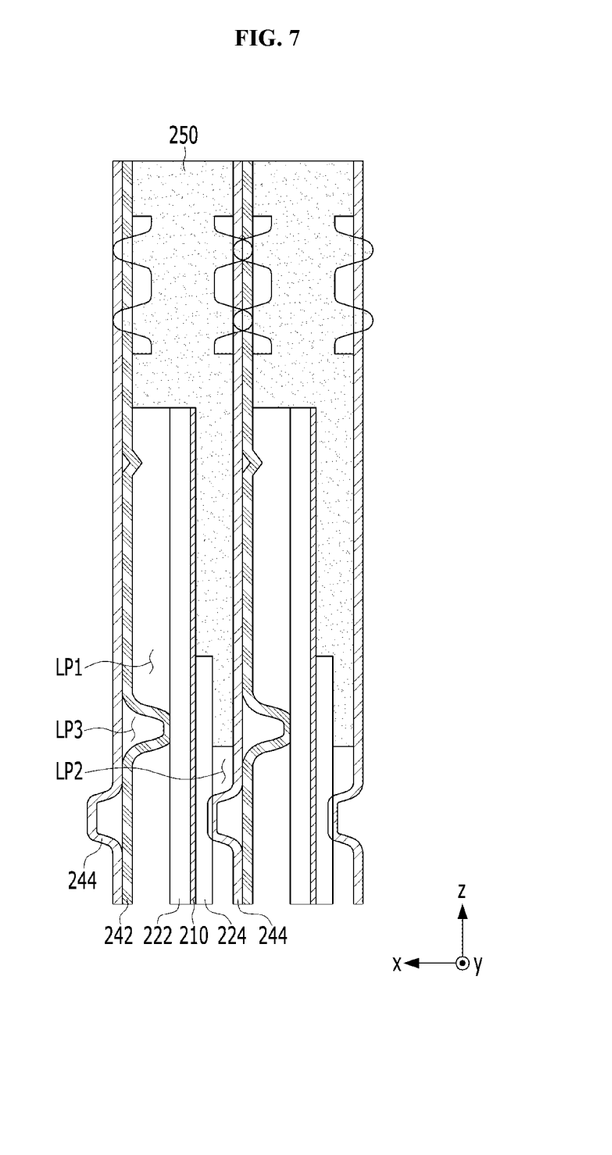
FIG. 7 is an exemplary cross-sectional view of the end of a cell stack according to an exemplary embodiment of the present disclosure.

Hereinafter, various exemplary embodiments 300A, 300B and 300C of the current-collecting plate 300, which is in contact with the end of the cell stack 122 while maintaining airtightness and electrical conductivity, will be described with reference to the accompanying drawings. FIG. 7 is an exemplary cross-sectional view of the end of the cell stack 122. Before explaining the contact between the current-collecting plate 300 (300A, 300B or 300C) according to the exemplary embodiment and the end of the cell stack 122, an example of the end of the cell stack 122 will now be described with reference to FIG. 7. The components in FIG. 7 that are the same as those in FIG. 2 are denoted by the same reference numerals, and a duplicate explanation thereof will be omitted.

Referring to FIG. 7, the space between the first separator 242 and the first gas diffusion layer 222 corresponds to a flow path LP1 through which hydrogen (or oxygen) as a reactant gas moves, the space between the second separator 244 and the second gas diffusion layer 224 corresponds to a flow path LP2 through which oxygen (or hydrogen) as a reactant gas moves, and the space between the first separator 242 and the second separator 244 corresponds to a flow path LP3 through which a cooling medium moves.

In addition, each of the unit cells included in the cell stack 122 may further include a cell frame 250. The cell frame 250 may be coupled to the membrane electrode assembly 210, the first and second gas diffusion layers 222 and 224, and the first and second separators 242 and 244 using a method such as bonding or welding.

Figure 8:
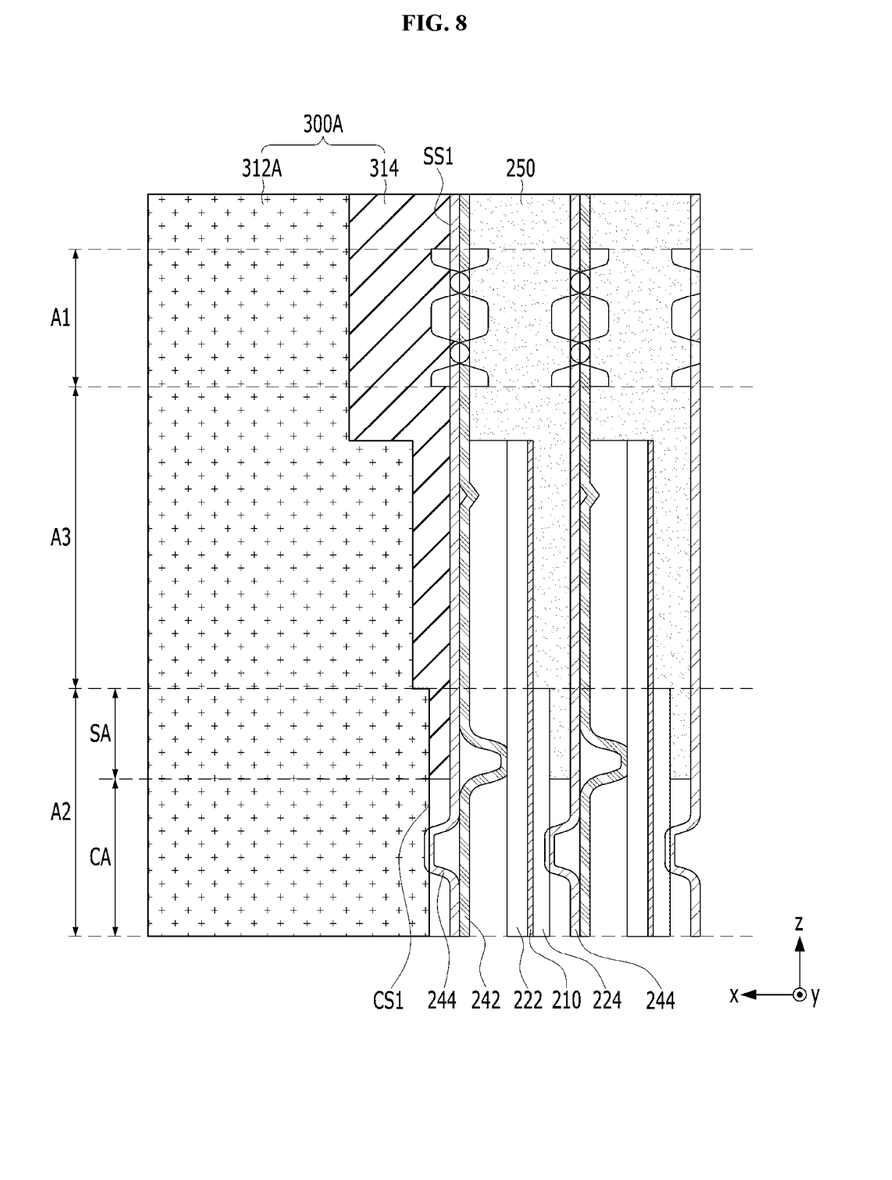
FIG. 8 is a cross-sectional view showing the coupling structure of the cell stack and a current-collecting plate according to an exemplary embodiment of the present disclosure.
Figure 9:
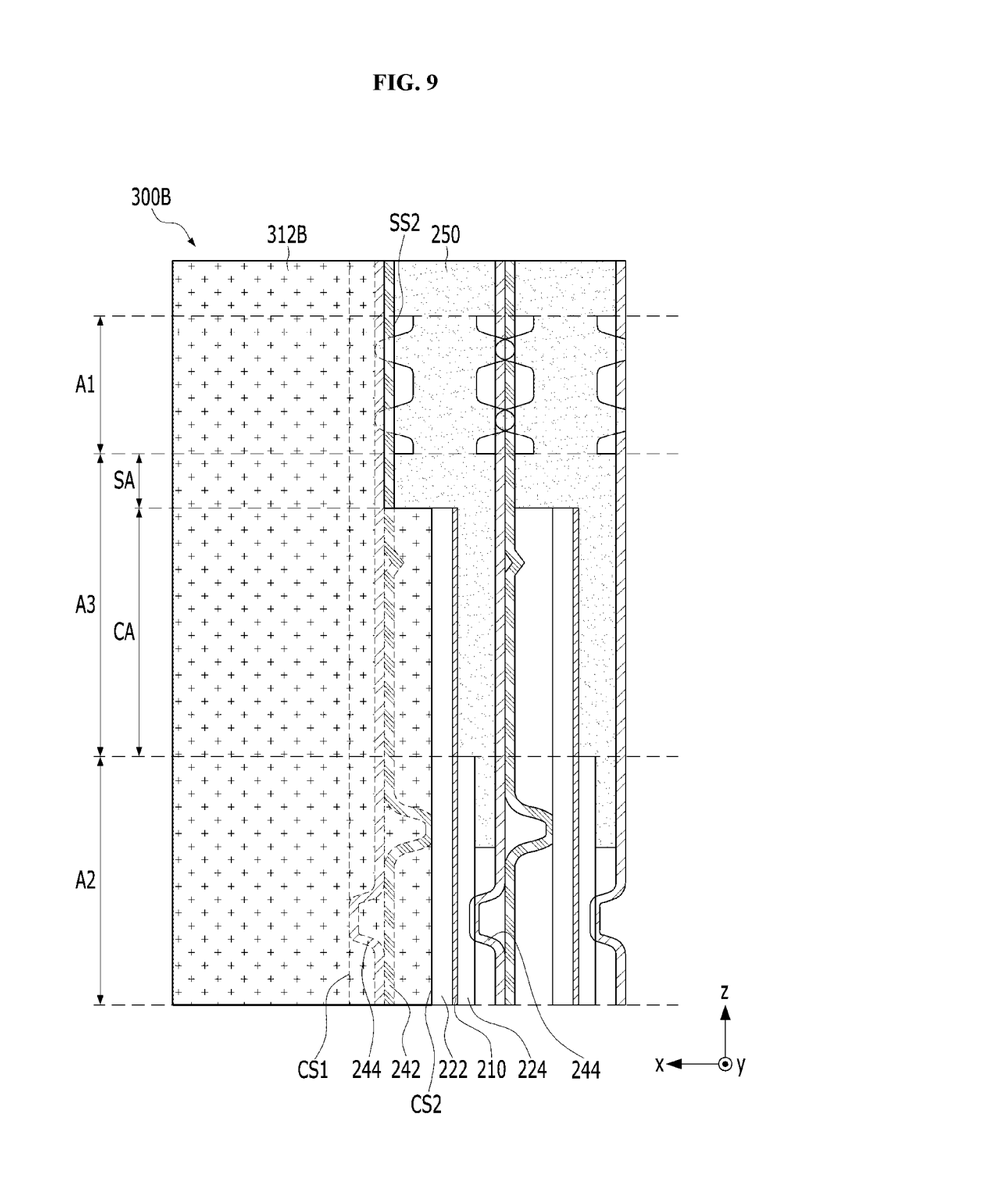
FIG. 9 is a cross-sectional view showing the coupling structure of the cell stack and a current-collecting plate according to an exemplary embodiment of the present disclosure.
Figure 10:
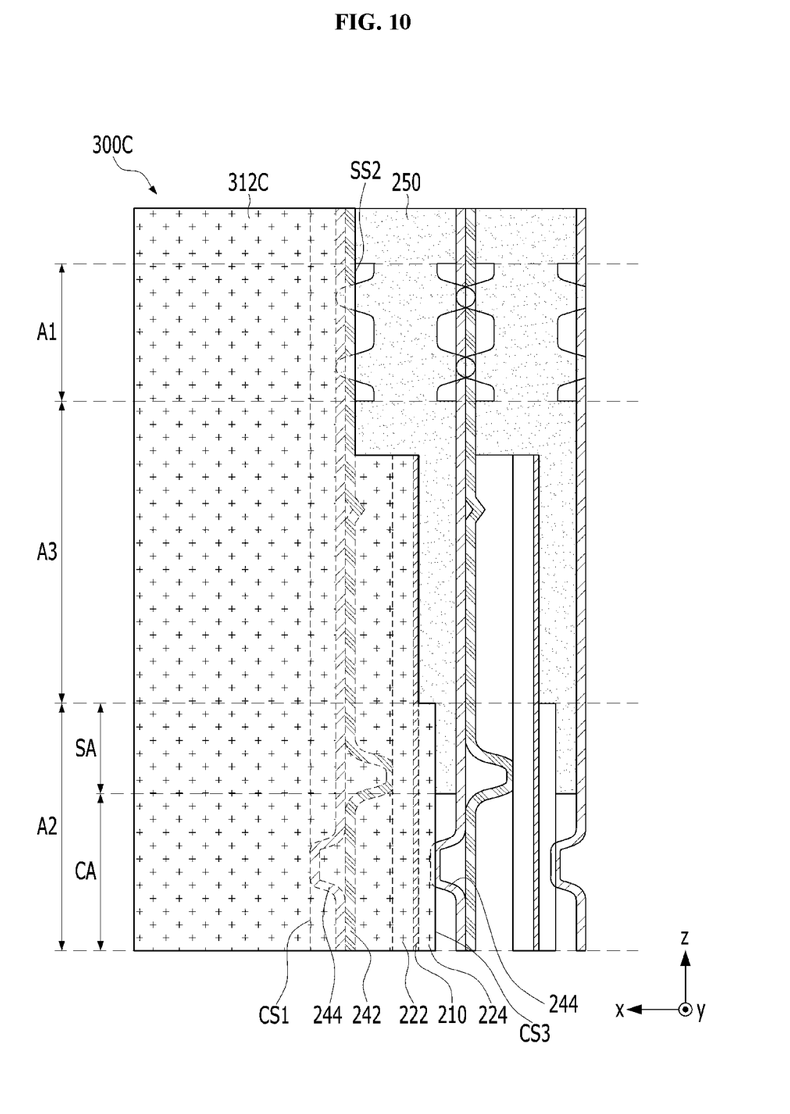
FIG. 10 is a cross-sectional view showing the coupling structure of the cell stack and a current-collecting plate according to an exemplary embodiment of the present disclosure.

FIGS. 8 to 10 are cross-sectional views showing various coupling structures of the cell stack 122 and the current-collecting plates 300 (300A, 300B and 300C) according to the exemplary embodiments. The current-collecting plate 300A, 300B or 300C may include a conductive area and an airtight area.

The conductive area may be defined as an area that has a surface (hereinafter, referred to as a 'conductive surface') that is in electrically conductive surface contact with the reaction surface of the end of the cell stack 122 that faces the current-collecting plate 300A, 300B or 300C in the first direction. The conductive area may collect the power generated by the cell stack 122. As described above, the conductive area may correspond to the center area 310I of the current collector 310.

The airtight area may be defined as an area that has a surface (hereinafter, referred to as an 'airtight surface') that is in airtight surface contact with the non-reaction surface of the end of the cell stack 122 that faces the current-collecting plate 300A, 300B or 300C in the first direction. As illustrated in FIG. 3, the airtight area may have a shape that surrounds the conductive area. In other words, referring to FIG. 3, the airtight area may correspond to the peripheral portion 3100 of the current collector 310 and the insulator 320.

In addition, as shown in FIGS. 8 to 10, the current-collecting plate 300A, 300B or 300C may include first to third areas A1, A2 and A3. According to an exemplary embodiment, as shown in FIG. 9, the entirety of the first area A1 may be included in the airtight area SA, and the entirety of the second area A2 may be included in the conductive area CA.

According to another exemplary embodiment, as shown in FIGS. 8 and 10, the entirety of the first area A1 may be included in the airtight area, a portion of the second area A2 may be included in the conductive area CA, and the remaining portion of the second area A2 may be included in the airtight area SA. Further, the third area A3 may be included in at least one of the airtight area SA or the conductive area CA. For example, as shown in FIG. 8, the third area A3 may be included in the airtight area SA. As shown in FIG. 9, a portion of the third area A3 may be included in the airtight area SA, and the remaining portion thereof may be included in the conductive area CA. As shown in FIG. 10, the entirety of the third area A3 may be included in the airtight area SA.

In the current-collecting plate 300A, 300B or 300C according to the exemplary embodiment, the extent to which the conductive surface protrudes toward the end of the cell stack 122 in the first direction (e.g. the length) and the extent to which the airtight surface protrudes toward the end of the cell stack 122 in the first direction may be different from each other. The degrees to which the conductive surface and the airtight surface protrude may vary based on the shape of the end of the cell stack 122. The degrees to which the conductive surface and the airtight surface protrude may be determined to secure airtightness and conductivity with the end of the cell stack 122.

According to an exemplary embodiment, the airtight surface may protrude further toward the end of the cell stack 122 in the first direction than the conductive surface. For example, as shown in FIG. 8, the airtight surface SS1 of the current-collecting plate 300A may protrude further toward the end of the cell stack 122 in the first direction than the conductive surface CS1. The current-collecting plate 300A shown in FIG. 8 may include a body 312A and a current-collecting frame 314. The body 312A may include at a first side thereof with a conductive surface CS1, which is in surface contact with the separator 244, which is the end of the cell stack 122. The current-collecting frame 314 may be disposed to fill the space between a second side of the body 312A (e.g., an opposite side) and the separator 244 in the airtight area (e.g. A1, A3 and SA in A2).

The body 312A and the current-collecting frame 314 may be integrally formed with each other. For example, the body 312A and the current-collecting frame 314 may be integrally formed through bonding and/or injection molding. However, according to another exemplary embodiment, the body 312A and the current-collecting frame 314 may be provided separately. The material of the cell frame 250 and the material of the current-collecting frame 314 may be the same as or different from each other.

At least one of the cell frame 250 or the current-collecting frame 314 may exhibit at least one of elasticity or electrical insulativity (e.g., insulating properties). For example, each of the cell frame 250 and the current-collecting frame 314 shown in FIG. 8 may exhibit both elasticity and electrical insulativity. In addition, the material of at least one of the cell frame 250 or the current-collecting frame 314 may be the same as the material of the gasket shown in FIG. 2. For example, the material of at least one of the cell frame 250 or the current-collecting frame 314 may be ethylene propylene diene monomer rubber (EPDM) or silicon. However, the disclosure is not limited to any specific material of these components 250 and 314.

According to another exemplary embodiment, the conductive surface may protrude further toward the end of the cell stack 122 in the first direction than the airtight surface. For example, as shown in FIG. 9, the conductive surface CS2 of the current-collecting plate 300B may protrude further toward the end of the cell stack 122 in the first direction than the airtight surface SS2. In addition, as shown in FIG. 10, the conductive surface CS3 of the current-collecting plate 300C may protrude further toward the end of the cell stack 122 in the first direction than the airtight surface SS2.

The current-collecting plate 300B or 300C shown in FIG. 9 or 10 may include only a body 312B or 312C. The body 312B or 312C may include an airtight surface SS2 formed at a first side thereof, which is in airtight surface contact with the cell frame 250, which corresponds to the non-reaction surface. As one example, as shown in FIG. 9, the cell frame 250 and the first gas diffusion layer 222 may be exposed at the end of the cell stack 122, and the first and second separators 242 and 244 disposed on the left side of the first gas diffusion layer 222 and indicated by the dotted lines may be omitted.

In particular, the body 312B may include a conductive surface CS2 formed at a second side thereof, which protrudes in the first direction toward the first gas diffusion layer 222, which corresponds to the reaction surface, and is in surface contact with the first gas diffusion layer 222. Since the first and second separators 242 and 244 indicated by the dotted lines are omitted, the conductive surface CS2 may further protrude toward the first gas diffusion layer 222, which is the end of the cell stack 122, in the first direction than the conductive surface CS1 shown in FIG. 8.

As another example, as shown in FIG. 10, the cell frame 250 and the second separator 244 may be exposed at the end of the cell stack 122, and the first and second separators 242 and 244, the first and second gas diffusion layers 222 and 224, and the membrane electrode assembly 210 which are disposed at the left side of the second separator 244 and indicated by the dotted lines may be omitted. In particular, the body 312C may include a conductive surface CS3 formed at a second side thereof, which protrudes toward the second separator 244, which corresponds to the reaction surface, and is in surface contact with the second separator 244. Since the membrane electrode assembly 210, the first and second separators 242 and 244, and the first and second gas diffusion layers 222 and 224 are omitted, the conductive surface CS3 may further protrude toward the second separator 244, which is the end of the cell stack 122, in the first direction than the conductive surface CS1 shown in FIG. 8 or the conductive surface CS2 shown in FIG. 9.

As still another example, although not shown, when the cell frame 250 and the membrane electrode assembly 210 are exposed at the end of the cell stack 122 and when the first and second separators 242 and 244 and the first gas diffusion layer 222 which are disposed on the left side of the membrane electrode assembly 210 are omitted, the body 312C may include a conductive surface formed at a second side thereof (e.g., an opposite side), which protrudes toward the membrane electrode assembly 210, which corresponds to the reaction surface, and is in surface contact with the membrane electrode assembly 210.

Figure 11:
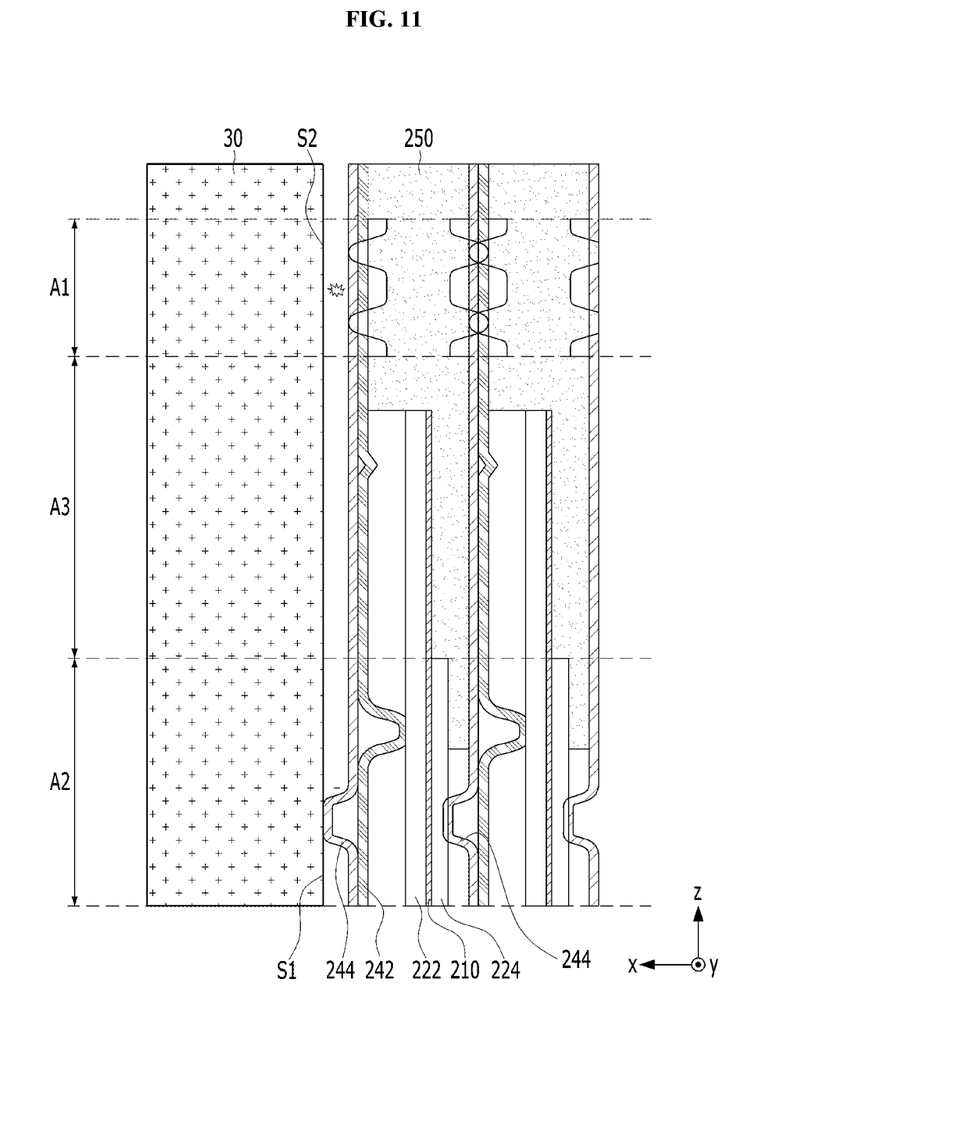
FIG. 11 is a cross-sectional view showing the coupling structure of a current-collecting plate according to a comparative example and a cell stack having an exemplary end shape.
Figure 12:
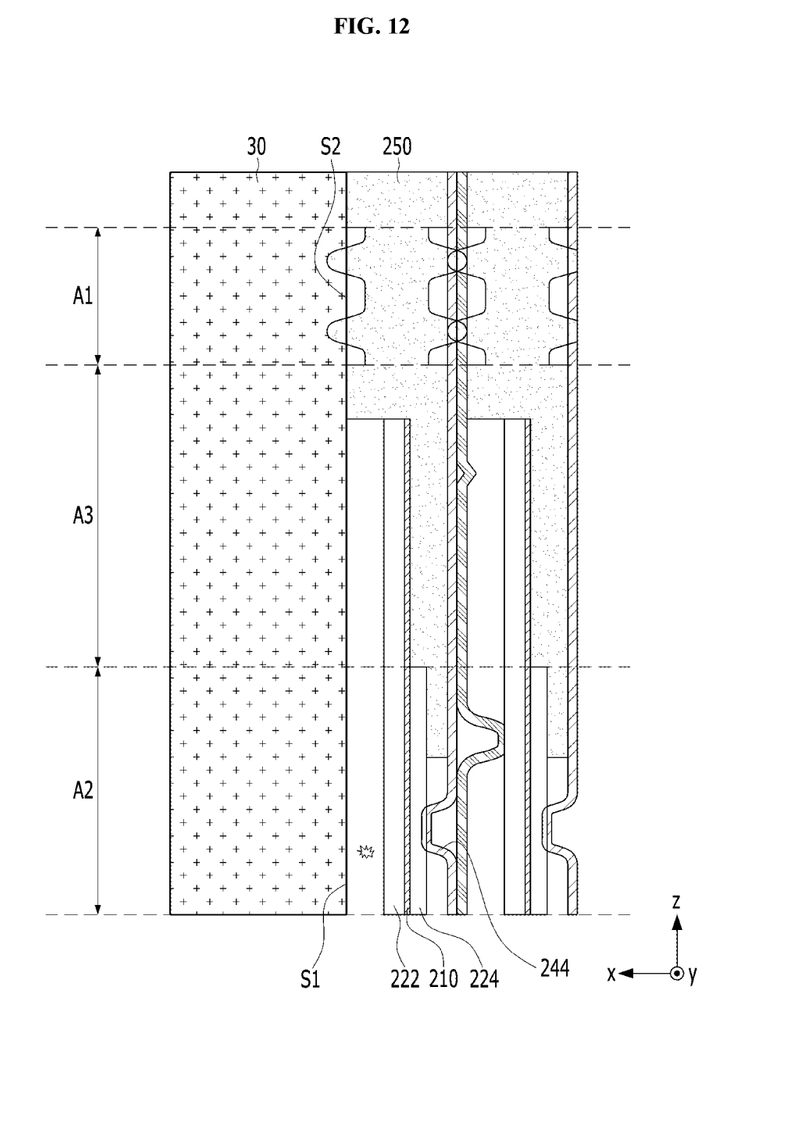
FIG. 12 is a cross-sectional view showing the coupling structure of a current-collecting plate according to the comparative example and a cell stack having another exemplary end shape.

Hereinafter, a current-collecting plate according to a comparative example and the current-collecting plate according to the exemplary embodiment will be compared and described. FIGS. 11 and 12 are cross-sectional views showing the coupling structure of a current-collecting plate 30 according to the comparative example and the cell stack 122 having various end shapes.

The components of the cell stack 122 shown in FIGS. 11 and 12 that are the same as those of the cell stack 122 shown in FIG. 7 are denoted by the same reference numerals, and a duplicate explanation thereof will be omitted. Unlike the current-collecting plates 300A, 300B and 300C according to the exemplary embodiments, in the current-collecting plate 30 according to the comparative example, the degree to which the conductive surface S1 protrudes toward the end of the cell stack 122 in the first direction (e.g. the length in the first direction) is the same as the degree to which the airtight surface S2 protrudes toward the end of the cell stack 122 in the first direction.

When the end of the cell stack 122 has the same shape as shown in FIG. 11, in the current-collecting plate 30 according to the comparative example, the conductive surface S1, which faces the end of the cell stack 122, is in surface contact with the separator 244, which is the reaction surface of the cell stack 122, and thus electrical conductivity may be secured, but the airtight surface S2 is spaced apart from the end of the cell stack 122, and thus airtightness is not secured.

Alternatively, when the end of the cell stack 122 has the same shape as shown in FIG. 12, in the current-collecting plate 30 according to the comparative example, the airtight surface S2 may be in surface contact with the cell frame 250 of the cell stack 122, and thus airtightness may be secured, but the conductive surface S1, which faces the end of the cell stack 122, may be spaced apart from and is not in surface contact with the first gas diffusion layer 222, which is the reaction surface of the cell stack 122, and thus electrical conductivity may not be secured. Therefore, the current-collecting plate 30 according to the comparative example may not transmit the power generated by the cell stack 122 to the outside.

On the other hand, in the case of the current-collecting plates 300A, 300B and 300C according to the exemplary embodiments, as illustrated in FIGS. 8 to 10, the degree to which the conductive surface protrudes toward the end of the cell stack 122 in the first direction and the degree to which the airtight surface protrudes toward the end of the cell stack 122 in the first direction may be set to be different from each other according to the shape of the end of the cell stack 122, thereby securing both airtightness and conductivity.

In addition, when the entirety of the current-collecting plate 30 according to the comparative example is formed of metal, the manufacturing costs and weight thereof may increase. Particularly, the interior of the manifold may be corroded by a reactant gas and a cooling medium. In order to solve the problems, when the interior of the manifold is sealed using a grommet, the manufacturing costs and the weight may further increase.

On the other hand, in the case of the current-collecting plate 300 (300A, 300B or 300C) according to the exemplary embodiment, since the conductive area may be formed of metal and the insulator 320, which occupies a majority of the airtight area, may be formed of an insulative material, the manufacturing costs and weight thereof may be less than those of the current-collecting plate 30 according to the comparative example. In addition, in the case of the current-collecting plate 300 (300A, 300B or 300C) according to the exemplary embodiment, since the first to third inlet communication portions MI1, MI2, and MI3 and the first to third outlet communication portions MO1, MO2 and MO3, which are manifolds, may be located in the insulator 320, the manifolds may be prevented from being corroded even when the interiors of the manifold are not sealed using a grommet, which is used in the comparative example, thereby securing electrical insulativity and corrosion resistance. In addition, since a separate member such as a grommet is not required, a manufacturing process may be simplified, manufacturing costs may be further reduced, and the weight may be further reduced, compared to the comparative example.

When the entirety of the current-collecting plate 30 according to the comparative example is formed of metal, heat may be dissipated in the first to third directions due to high thermal conductivity of metal. On the other hand, in the case of the current-collecting plate of the fuel cell according to the exemplary embodiment, the current collector 310 may be formed of metal and the insulator 320 may be formed of an insulative material, such as rubber, which has a lower heat transfer coefficient than metal.

Thus, compared to the comparative example, the thermal capacity of the current-collecting plate 300 is minimal, and the amount of heat dissipated to the outside therefrom is minimal. Accordingly, a heat transfer path, along which heat is more efficiently transferred in the first direction, may be formed. Since a heat transfer path, along which heat is transferred from a heating element to an end cell without loss, is formed, it may be possible to rapidly increase the temperature of the fuel cell. In addition, in the case of the current-collecting plate 300A shown in FIG. 8, when an external clamping pressure is applied to the fuel cell, the current-collecting frame 314 having elasticity may perform a shock-absorbing function for the end of the cell stack 122, for example, the end cell disposed at the end of the cell stack 122.

In addition, in the current-collecting plate according to the comparative example, the current-collecting terminal may be disposed to penetrate the end plate. On the other hand, the current-collecting terminal 316 of the current-collecting plate 300 according to the exemplary embodiment protrudes in the second direction crossing the first direction. Thus, compared to the comparative example, the fuel cell according to the embodiment may be reduced in length in the first direction, and an electric power extraction path may be simplified. In other words, the fuel cell according to the exemplary embodiment may be made compact.

As is apparent from the above description, the exemplary embodiment provides a fuel cell, which secures airtightness and electrical conductivity between a current-collecting plate and a cell stack, secures electrical insulativity and corrosion resistance, reduces the manufacturing costs and weight thereof, simplifies the manufacturing process thereof, has a high temperature increase speed, and has a compact structure.

The above-described various exemplary embodiments may be combined with each other without departing from the objects of the present disclosure unless they are contrary to each other. In addition, for any element that is not described in detail of any of the various exemplary embodiments, reference may be made to the description of an element having the same reference numeral in another exemplary embodiment.

While the present disclosure has been particularly shown and described with reference to exemplary embodiments thereof, these exemplary embodiments are only proposed for illustrative purposes and do not restrict the present disclosure, and it will be apparent to those skilled in the art that various changes in form and detail may be made without departing from the essential characteristics of the exemplary embodiments set forth herein. For example, respective configurations set forth in the exemplary embodiments may be modified and applied. Further, differences in such modifications and applications should be construed as falling within the scope of the present disclosure as defined by the appended claims.

What is claimed is:

1. A fuel cell, comprising:
 a cell stack having a plurality of unit cells stacked in a first direction;
 an end plate disposed at an end of the cell stack; and
 a current-collecting plate disposed between the end plate and the end of the cell stack,
 wherein the current-collecting plate includes:
  a conductive area having a conductive surface formed to be in electrically conductive surface contact with a reaction surface of the end of the cell stack that faces the current-collecting plate in the first direction, wherein the conductive area is configured to collect power generated by the cell stack; and
  an airtight area having an airtight surface formed to be in surface contact with a non-reaction surface of the end of the cell stack that faces the current-collecting plate in the first direction, wherein the airtight area surrounds the conductive area,
 wherein a degree to which the conductive surface protrudes toward the end of the cell stack in the first direction and a degree to which the airtight surface protrudes toward the end of the cell stack in the first direction are different from each other, and
 wherein a whole of the airtight surface is in surface contact with the non-reaction surface.

2. The fuel cell according to claim 1, wherein each of the plurality of unit cells includes:
 a membrane electrode assembly;
 a gas diffusion layer disposed on each of opposite sides of the membrane electrode assembly;
 a separator disposed outside the gas diffusion layer to separate each of the plurality of unit cells from another cell; and
 a cell frame coupled to the membrane electrode assembly, the gas diffusion layer, and the separator.

3. The fuel cell according to claim 2, wherein the airtight surface protrudes further toward the end of the cell stack in the first direction than the conductive surface.

4. The fuel cell according to claim 3, wherein the current-collecting plate includes:
 a body having at a first side thereof the conductive surface that is in surface contact with the separator, the separator being the end of the cell stack; and
 a current-collecting frame configured to fill a space between a second side of the body and the separator in the airtight area.

5. The fuel cell according to claim 4, wherein the body and the current-collecting frame are integrally formed with each other.

6. The fuel cell according to claim 4, wherein the body and the current-collecting frame are provided separately from each other.

7. The fuel cell according to claim 4, wherein a material of the cell frame and a material of the current-collecting frame are same as each other.

8. The fuel cell according to claim 4, wherein a material of the cell frame and a material of the current-collecting frame are different from each other.

9. The fuel cell according to claim 4, wherein at least one of the cell frame or the current-collecting frame has at least one of elasticity or electrical insulativity.

10. The fuel cell according to claim 2, wherein the conductive surface protrudes further toward the end of the cell stack in the first direction than the airtight surface.

11. The fuel cell according to claim 10, wherein the current-collecting plate includes:
a body having at a first side thereof the airtight surface that is in airtight surface contact with the cell frame corresponding to the non-reaction surface, and
wherein the body has at a second side thereof the conductive surface that protrudes toward the gas diffusion layer corresponding to the reaction surface, the separator, or the membrane electrode assembly to be in surface contact therewith.

12. The fuel cell according to claim 1, wherein the current-collecting plate includes:
a current collector that corresponds to the conductive area, the current collector having electrical conductivity; and
an insulator that corresponds to the airtight area, the insulator surrounding the current collector and having electrical insulativity.

13. The fuel cell according to claim 12, wherein the insulator includes a plurality of manifolds through which fluid is introduced from an outside or discharged outside.

14. The fuel cell according to claim 12, wherein the current-collecting plate further includes a current-collecting terminal that extends from the current collector in a second direction crossing the first direction, and wherein the current-collecting terminal is configured to provide power to an outside.

15. The fuel cell according to claim 12, wherein the insulator has elasticity.

16. The fuel cell according to claim 12, wherein the current-collecting plate further includes an adhesive to combine the current collector and the insulator.

17. The fuel cell according to claim 12, wherein the current collector includes at least one through-hole through which at least a portion of the insulator passes.

* * * * *